(12) United States Patent
Hooks et al.

(10) Patent No.: US 6,169,542 B1
(45) Date of Patent: Jan. 2, 2001

(54) METHOD OF DELIVERING ADVERTISING THROUGH AN INTERACTIVE VIDEO DISTRIBUTION SYSTEM

(75) Inventors: Darryl C. Hooks; James A. Witoszynski, both of Los Angeles, CA (US); M. Shannon Lunsford, Lafayette; Melissa A. Boggs, Lyons, both of CO (US)

(73) Assignee: GTE Main Street Incorporated, Irving, TX (US)

( * ) Notice: Under 35 U.S.C. 154(b), the term of this patent shall be extended for 0 days.

(21) Appl. No.: 09/211,708

(22) Filed: Dec. 14, 1998

(51) Int. Cl.$^7$ .................................................... H04N 7/173
(52) U.S. Cl. ............................ 345/327; 348/7; 348/12; 455/5.1
(58) Field of Search ............................ 345/327; 348/9, 348/7, 12, 13, 906, 553, 554, 907, 6, 10; 455/5.1, 4.2, 6.1, 6.2, 6.3; 709/217, 218, 219; H04N 7/173

(56) References Cited

U.S. PATENT DOCUMENTS

| 5,600,364 | * | 2/1997 | Hendricks et al. ................... 348/1 |
| 5,761,648 | | 6/1998 | Golden et al. . |
| 5,940,073 | * | 8/1999 | Klosterman et al. ............... 345/327 |
| 5,977,962 | * | 11/1999 | Chapman et al. ................... 345/327 |

* cited by examiner

Primary Examiner—Chris Grant
(74) Attorney, Agent, or Firm—Leonard Charles Suchyta

(57) ABSTRACT

An interactive video distribution system includes a plurality of interactive video subscriber units (22), a head end facility (54), and a video distribution medium (56). The head end facility (54) is configured to transmit advertisements (40, 42) in connection with an interactive video program (36) and receive requests from one of the subscriber units (22') to register the advertisements (40, 42) in a menu (116). In response to each of the requests, the head end facility (54) generates a entries (118, 144) associated with the advertisements (40, 42) in the menu (116). The menu (116) is communicated in a first video still image (134) to the subscriber unit (22') through the medium (56). The head end facility (54) is further configured to obtain a selection request for one of entries (118, 144) and provide supplementary advertising information (148) associated with the selected one of advertisements (40, 42) to the subscriber unit (22').

26 Claims, 6 Drawing Sheets

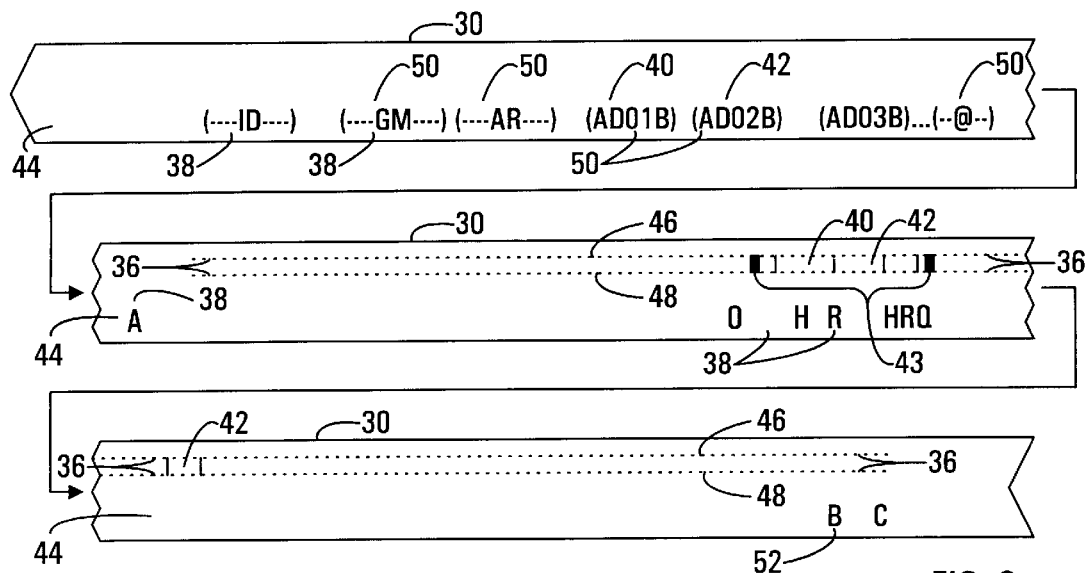

FIG. 2

| EXEMPLARY SYNCHRONIZATION CHANNEL CODES ||
| ASCII CHARACTER | PURPOSE |
| --- | --- |
| ID | UNIQUE SHOW ID INFO |
| GM | BEGINNING OF PROGRAM SPECIFIC DATA |
| @ | END OF PROGRAM SPECIFIC DATA |
| AD#...B | INTERACTIVE ADVERTISEMENT |
| AD#...N | NON-INTERACTIVE ADVERTISEMENT |
| AR | INTERACTIVE BREAK/ROUND |
| H | CLEAR SCREEN OF INFORMATION/CLEAR ADVERTISEMENT OF RECEIPT |
| O | START OF ADVERTISING BREAK/ROUND |
| Q | END OF ADVERTISING BREAK/ROUND |
| R | END OF INDIVIDUAL ADVERTISEMENT |
| A | START OF INTERACTIVE VIDEO PROGRAM |
| B | END OF INTERACTIVE VIDEO PROGRAM |
| C | END OF ALL CONTENT |

FIG. 3

METHOD OF DELIVERING ADVERTISING THROUGH AN INTERACTIVE VIDEO DISTRIBUTION SYSTEM

TECHNICAL FIELD OF THE INVENTION

This invention relates generally to the effective delivery of advertising. More specifically, the present invention relates to delivering advertising through an interactive video distribution system.

BACKGROUND OF THE INVENTION

The communications industry, such as television, radio, written periodicals, and so forth, uses advertising as a means for informing or teaching consumers of a particular subject matter. An advertisement may be a paid announcement of goods or services for sale, a public notice, or any other such mechanism for informing the general public of a particular subject matter.

In addition to informing consumers, paid advertisements generate income for the communications provider. This income is used to produce the television or radio programs, the periodicals, and so forth, so as to offset the cost of the communication media to the consumer. In order for advertising to be effective, however, the advertisement should reach a large number of people and the advertisement should include information that is easy to recall.

In the television industry, an advertisement is a full-motion or still image video segment which is inserted into the video programming. The video segment is typically short, for example thirty to sixty seconds. Unfortunately, it is often difficult for an advertiser to provide detailed information regarding the product, service, or public notice during such a short time period.

One potential solution for providing detailed information is to increase the duration of the advertisement. Unfortunately, the block of time, or airtime, sold by a television station to an advertiser is costly, rendering it cost prohibitive for advertisers to broadcast longer duration advertisements. Moreover, viewers are likely to become impatient with long advertisements and change the television to a different television channel. This is particularly true if a viewer is not interested in the advertised product, service, or public notice.

Since airtime is limited, advertisers conventionally provide supplementary advertising information, such as a telephone number, mailing address, or an Internet web site address so that viewers may obtain additional information at a later time. In order to retain this supplementary advertising information, a viewer must quickly commit the information to memory during the conventional thirty or sixty second video segment. Alternatively, the viewer may be compelled to search for a paper and pen in order to write down the supplementary information. Unfortunately, the supplementary information may not be accurately committed to memory or recorded. In other words, a conventional television advertisement may not effectively provide information to the viewer because the viewer cannot successfully remember or record the supplementary advertising information.

A conventional advertisement is in a short duration linear programming format. In other words the content sequence is predetermined and does not vary in response to user input. Thus, there is no way for the viewer to review the advertisement for any missed information once the advertisement is over. Accordingly, an advertiser may broadcast the advertisement several times during a television program so that viewers can obtain all of the supplementary advertising information in subsequent broadcasts of the advertisement. Repeatedly broadcasting the same advertisement undesirably drives up the costs associated with advertising. The advertising budget is typically indirectly paid for by the consumer through the purchase cost of the product or service. Thus, repeatedly broadcasting the same advertisement undesirably drives up the cost of the product or service for the consumer.

When the telephone number, advertiser address, or the Internet web site address is successfully remembered or recorded, it is necessary for the viewer to undertake later communication with the advertiser if the viewer is interested in learning more about the advertised product, service, or public notice. For example, following the advertisement, the viewer may call the advertiser over a conventional telephone line, send a letter to the advertiser using conventional mail delivery, or access the advertiser's web site through a computer system. Unfortunately, this later action is inconvenient to the viewer, and the viewer may be less likely to perform this subsequent action.

SUMMARY OF THE INVENTION

Accordingly, it is an advantage of the present invention that a method and system are provided for effectively delivering advertising to viewers.

Another advantage of the present invention is a method and system are provided for conveniently providing supplementary advertising information to a viewer.

Yet another advantage of the present invention is that a method and system are provided for obtaining supplementary advertising information through a viewer's television in connection with interactive video programming.

The above and other advantages of the present invention are carried out in one form by a method of delivering advertising through a head end facility of an interactive video distribution system. The method calls for transmitting an advertisement to an interactive video subscriber unit in connection with an interactive video program and receiving, at the head end facility over a return path, a request to register the advertisement in a menu. The method further calls for generating an entry for the advertisement in the menu, communicating to the subscriber unit, the menu in a video still image, and obtaining, at the head end facility over the return path, a selection request for the entry. In response to the selection request, the method then calls for providing to the subscriber unit supplementary advertising information associated with the advertisement.

The above and other advantages of the present invention are carried out in another form by an interactive video distribution system which includes a plurality of interactive video subscriber units and a head end facility configured to transmit an advertisement in connection with an interactive video program and receive a request from one of the subscriber units to register the advertisement in a menu. A video distribution medium is coupled between the head end facility and the interactive video subscriber units. The video distribution medium is configured to convey the advertisement to each of the interactive video subscriber units on a forward path and convey the request from the one of the subscriber units to the head end facility on a return path.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

FIG. 2 shows a timing diagram which depicts coordination between a full-motion program recorded on a recording medium and exemplary data codes also recorded on the recording medium;

FIG. 3 shows a table explaining functions for some of the data codes shown in FIG. 2;

DETAILED DESCRIPTION OF THE PREFERRED EMBODIMENTS

Figure 1:
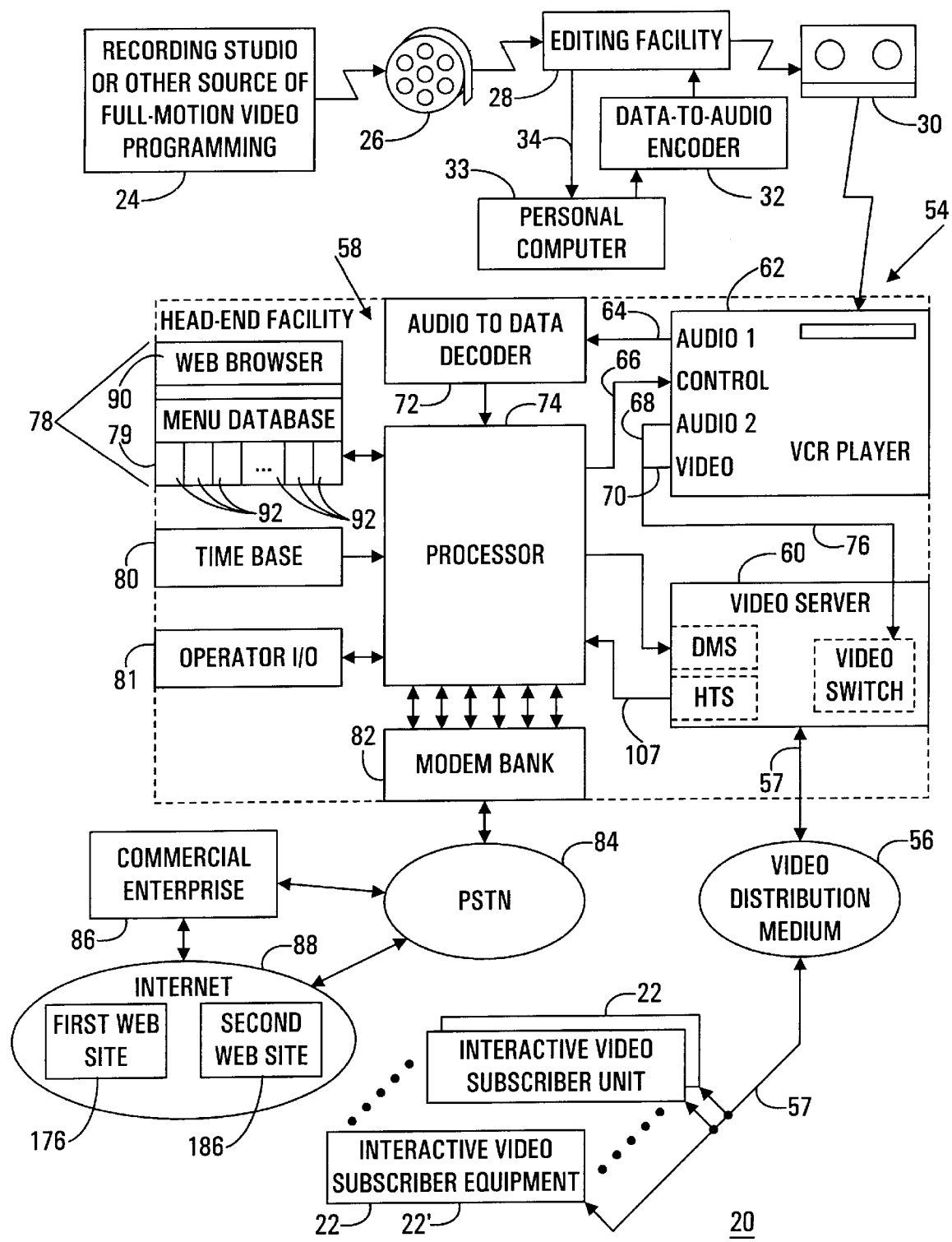
FIG. 1 shows a block diagram of an interactive video distribution system for delivering advertising to a plurality of interactive video subscriber units.

FIG. 1 shows a block diagram of an interactive video distribution system 20 for delivering advertising to a plurality of interactive video subscriber units 22. Interactive video programming allows a subscriber to control the sequencing of content or programming presented in a television. Interactive video programming can be contrasted with the more traditional full-motion video, also referred to as linear programming, in which content sequence is predetermined and does not vary in response to user input. The entertainment, education, and related industries are increasingly providing interactive programming because such programming achieves greater involvement from the users. Accordingly, some of the principles of interactive video programming are used in the present invention for providing more effective delivery of advertising.

A recording studio 24 is used in a conventional manner to record an independent, full-motion program on a recording medium 26. In other words, studio 24 represents a source of video or audio/video programming. FIG. 1 illustrates medium 26 as being film, but many other recording media known to those skilled in the art may be used as well.

The content of the program is not important in the present invention. The program may include audio, full-motion video and still image video components. The program may be produced strictly for use in connection with interactive video distribution system 20. Alternatively, the program may be or may have previously been produced for performance through conventional full-motion distribution channels, such as movies, television, video tape, cable television, and the like.

System 20 includes a conventional editing facility 28. Through editing facility 28, a synchronizing channel is added to the program, and the edited program is recorded on a recording medium 30. In the preferred embodiment, medium 30 is a conventional video cassette recorder (VCR) tape having a video channel and two audio channels, but other media, such as digital memory, laser disk, and the like, may be used for other applications. In addition, editing facility 28 may add to or alter the original program from medium 26. For example, editing facility 28 may add new video programming to the original program, such as printed or textual questions, timers, textual answers to the questions, instructions, and so forth.

In addition, editing facility 28 generates advertisements or receives pre-recorded advertisements which are inserted into the original program during predetermined breaks in the original program. In the preferred embodiment, the advertisements are in a full-motion video format. However, nothing in the present invention limits the advertisements to the full-motion video format. Editing facility 28 is further configured to insert a logo (discussed below) into the full-motion advertisement. The logo informs a subscriber, or viewer, that the advertisement is an interactive advertisement. An interactive advertisement is an advertisement in which additional, or supplemental, advertising information, may be obtained from interaction through subscriber unit 22 (described below).

Alternatively, editing facility 28 may optionally shrink the original video programming so that the entire video portion of the original program occupies less than an entire display screen and then generate advertisements in the form of text or logos to be located in the portions of the display screen not now occupied by the original program.

Editing facility 28 operates in conjunction with a data-to-audio encoder 32 and a conventional personal computer 33. Data-to-audio encoder 32 is an ASCII code-to-audio signal encoder. Such an encoder may be implemented using modem tones, DTMF tones, or other techniques which may be devised by those skilled in the art.

In a preferred embodiment, editing facility 28 provides a timing signal to personal computer 33 at an output 34. In response to the timing signal, personal computer 33 accesses a file (not shown) having numerous data records. Each data record contains ASCII data codes (discussed below) which are used for synchronizing and personalizing the original program to a computer program (discussed below) that will assist in the implementation of the interactive portion of the original program. In addition, the computer program will assist in the implementation of the interactive advertisement.

When the timing signal is detected by personal computer 33 at output 34, personal computer 33 feeds the ASCII data code to encoder 32 which converts the data code to a sequence of audio signals or tones that are instantly recorded onto medium 30. Desirably, the synchronizing audio signals are recorded on one audio channel of medium 30 and the audio from the original program on recording medium 26 is placed on another audio channel of medium 30.

FIG. 2 shows a timing diagram which depicts coordination between a full-motion program 36 recorded on recording medium 30 and exemplary ASCII data codes 38 also recorded on recording medium 30. A first advertisement 40 and a second advertisement 42 are full-motion video segments which are inserted into full-motion program 36 at a predetermined time period, such as during an advertisement break 43. Advertisement break 43 is a grouping of a multiple number of advertisements placed back to back on recording medium 30. First and second advertisements 40 and 42, respectively, will be transmitted in advertisement break 43 as part of full-motion program 36.

FIG. 3 shows a table that explains how some of ASCII data codes 38 which are related to first and second advertisements 40 and 42, respectively, may be interpreted. As discussed above, the positioning of ASCII data codes 38 is coordinated on medium 30 with full-motion program 36.

As shown in FIG. 2, data codes 38 are recorded on a synchronization channel 44 while full-motion program 36, including first and second advertisements 40 and 42, respectively, are recorded on a video channel 46 and an audio channel 48. Those skilled in the art will appreciate that FIG. 2 depicts relative timing between data codes 38 and full-motion program 36, and that actual tracks upon which information are recorded on medium 30 need not appear in longitudinal lines as shown in FIG. 2. In addition, FIG. 2 depicts vertical lines separating full-motion program 36 from advertisement break 43, first advertisement 40, and second advertisement 42 for illustrative purposes. Those skilled in the art will recognize that the vertical lines do not actually appear on recording medium 30.

Referring to FIGS. 2 and 3, data codes 38 generally serve two different functions. In accordance with one function, data codes 38 convey program-specific data 50, and in accordance with the other function, data codes 38 convey synchronization signals 52. Program-specific data 50 personalize a generic computer program (discussed below) to successfully provide interactive services for the specific full-motion program 36 and for first and second advertisements 40 and 42, respectively. In other words, program-specific data 50 define the actions and/or the parameters of actions that the computer program undertakes while full-motion program 36, including first and second advertisements 40 and 42, is being broadcast to subscribers.

Of particular interest to the understanding of the present invention is program-specific data 50 related to first and second advertisements 40 and 42. Program-specific data 50 includes identifiers for identifying the interactive advertisements such as first and second advertisements 40 and 42. In the exemplary embodiment, "AD01B" program-specific data 50 is an advertisement identifier assigned to first advertisement 40. Likewise, "AD02B" program-specific data 50 is an advertisement identifier assigned to second advertisement 42. "AD# . . . N" program-specific data indicates an advertisement identifier for identifying any conventional (i.e. non-interactive) advertisements (not shown) that may be aired during advertisement break 43.

Other data codes 38 may include "ID" program-specific data 50 which is unique program identification information, "GM" program-specific data 50 signifying the beginning of program specific data, "@" program-specific data 50 marking the end of program specific data, and "AR" program-specific data 50 identifying advertisement break 43.

Program-specific data 50 are arranged to come before full-motion program 36 on medium 30. Thus, when medium 30 is played from its beginning, program-specific data 50 are read and stored in a head end facility processor (discussed below) before full-motion program 36 begins. This arrangement allows for precise synchronization between the computer program and full-motion program 36.

Program-specific data 50 do not inform the computer program when actions take place during full-motion program 36. However, synchronization signals 52 are placed precisely where needed on medium 30 relative to particular activities taking place in full-motion program 36, to inform the computer program when the actions are taking place. Thus, the computer program need not expend its processing time managing the program-specific data 50 while it provides interactive services for full-motion program 36 and first and second advertisements 40 and 42, respectively.

During the editing process performed with editing facility 28 (FIG. 1), appropriate synchronization signals 52, and their related encoded audio tones or signals, are selected for recording at appropriate times on medium 30. The selections are made in response to activities taking place in full-motion program 36. Each synchronization signal 52 defines an event that the computer program coordinates with full-motion program 36.

With continued reference to FIGS. 2–3, of particular interest to the understanding of the present invention are the specific synchronization signals 52 related to the beginning and end of advertisement break 43 and the end of each of first and second advertisements 40 and 42, respectively. For example, an "O" synchronization signal 52 represents a start signal for the start of advertisement break 43 and a "Q" synchronization signal 52 represents a stop signal for the completion of advertisement break 43. An "R" synchronization signal 52 signifies the end of an advertisement. Accordingly, O and Q synchronization signals 52 identify advertisement break 43 and R synchronization signal 52 identifies the end of an advertisement. The information supplied by O, Q, and R synchronization signals combined with the advertisement identifiers included in program-specific data 50 inform the computer program which advertisement is airing and when the advertisement is airing.

Other synchronization signals 52 may include an "A" synchronization signal 52 representing the start of full-motion program 36, a "B" synchronization signal 52 representing the end of full-motion program 36, and a "C" synchronization signal 52 representing the end of all interactive video content. Yet another one of synchronization signals 52 pertaining to first and second interactive advertisements 40 and 42, respectively, is an "H" synchronization signal 52 which will be discussed in detail below. In addition, there are program-specific data 50 and synchronization signals 52 associated with full-motion program 36 that are not illustrated in FIGS. 2–3 and are not pertinent to the understanding of the present invention.

A single advertisement break 43 having two advertisements is illustrated in FIG. 2. However, those skilled in the art will recognize that more than two advertisements may be transmitted in connection with full-motion program 36 during advertisement break 43 and there may be more than one advertisement break 43 associated with full-motion program 36. These additional advertisement breaks are also represented by start and stop synchronization signals and the advertisements are signified with end-of-advertisement synchronization signals.

Referring back to FIG. 1, after medium 30 has been prepared, it may be stored until needed by a head end facility 54 of interactive video distribution system 20. Head end facility 54 is in communication with any number of interactive video subscriber units 22 through a bidirectional video distribution medium 56. Video distribution medium 56 may, for example, be provided by a conventional cable television distribution network.

Head end facility 54 controls the distribution of audio/video programming through video distribution medium 56 to video subscriber units 22. Head end facility 54 includes a computer 58, a video server 60, and any number of VCR players 62, of which FIG. 1 shows only one.

Player 62 is compatible with medium 30. Player 62 has a first audio output 64, a remote control input 66, a second audio output 68, and a video output 70. Of course types of media that are different from medium 30 may use players 62 having other types of I/O channels. First audio output 64 provides synchronization channel 44 (FIG. 2) to an audio-to-data decoder 72 of computer 58. A processor 74 of computer 58 provides a control data output that couples to remote control input 66 of player 62.

Second audio output 68 and video output 70 together provide full-motion program 36 along with first and second advertisements 40 and 42, respectively, through an audio/video channel 76 which is coupled to a video switch element of video server 60. Processor 74 additionally has a data output that provides a video still image to a digital media server element of video server 60. Video server 60 multiplexes these two inputs with other optional video inputs, typically through modulation into different frequency bands, and outputs a broadband signal to video distribution medium 56.

Audio-to-data decoder 72 performs a complement to the operation described above in connection with data-to-audio encoder 32. Thus, audio-to-data decoder 72 includes tone decoders which recognize the audio tones recorded on synchronization channel 44 (FIG. 2) and generate the corresponding ASCII data codes 38 in response thereto. Audio-to-data decoder 72 couples to processor 74.

Computer 58 additionally includes a memory 78 which couples to processor 74, a time base 80 which couples to processor 74, an operator I/O section 81 which couples to processor 74, and a modem bank 82 which also couples to processor 74. Modem bank 82 couples through any number of telephone lines to a public switched telecommunications network (PSTN) 84. PSTN 84 is coupled through telephone lines to commercial enterprises 86, of which FIG. 1 shows only one. PSTN 84 is also coupled through telephone lines to the Internet 88, symbolically represented as a circular region in FIG. 1. Internet 88 is known to those skilled in the art as the connection system that links computers worldwide in a plurality of networks, otherwise known as a web.

Memory 78 includes data which serve as instructions to processor 74 and which, when executed by processor 74, cause head end facility 54 to carry out processes which are discussed below. For example, memory 78 includes a web browser 90. Web browser 90 is a program that acts as a tour guide for Internet 88. Web browser 90 includes pictorial desktops, directories, and search tools used for accessing Internet 88.

In addition, memory 78 includes variables, tables, and databases that are manipulated due to the operation of head end facility 54. For example, memory 78 includes a database 79 of menus 92, where one each of menus 92 is associated with one each of interactive video subscriber units 22. Menus are well known techniques in computer programming for allowing users to choose one or more of many different offered selections.

Time base 80 is provided so that computer 58 keeps track of the current real time. Operator I/O section 81 includes one or more of a keyboard, mouse, printer, video display terminal, buzzer, and other devices well known in the computer arts for the purposes of providing data to human operators and receiving data from the human operators.

Figure 4:
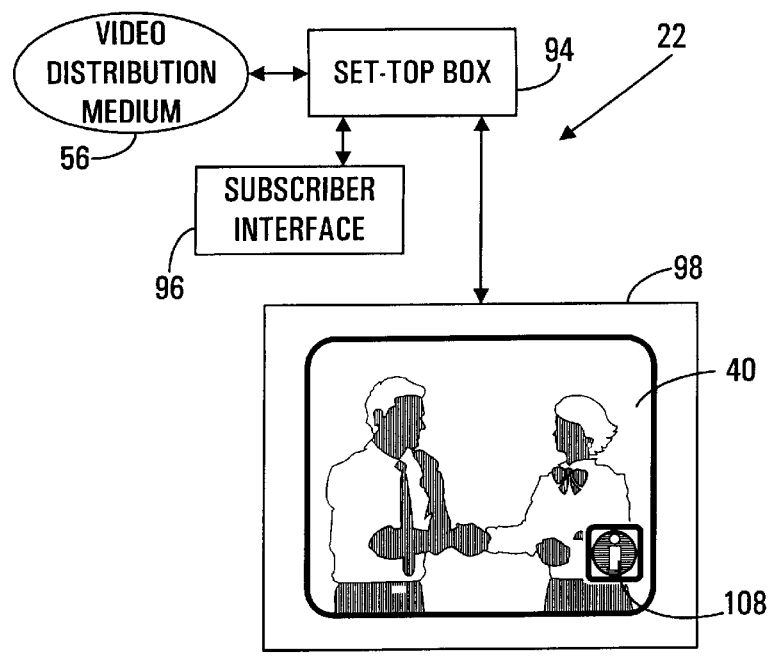
FIG. 4 shows a block diagram of the components of one of the interactive video subscriber units at a subscriber location.

FIG. 4 shows a block diagram of the components of one of the interactive video subscriber units 22 at a subscriber location. Interactive video subscriber unit 22 includes a set-top box 94 which couples to video distribution medium 56. Set-top box 94 also couples to a subscriber interface 96 and a television screen 98. Full-motion program 36 (FIG. 2), including first and second advertisements 40 and 42, is a collection of video, audio, and/or data signals which are combined to provide interactive video programming. Specific video, audio, and data segments of full-motion program 36 are selected and sent to a specific subscriber in response to subscriber input at set-top box 94 and viewed on television screen 98. The subscriber provides the user input at set-top box 94 through key-presses at subscriber interface 96. The key-presses are detected at set-top box 94 and sent to head end facility 54.

Figure 5:
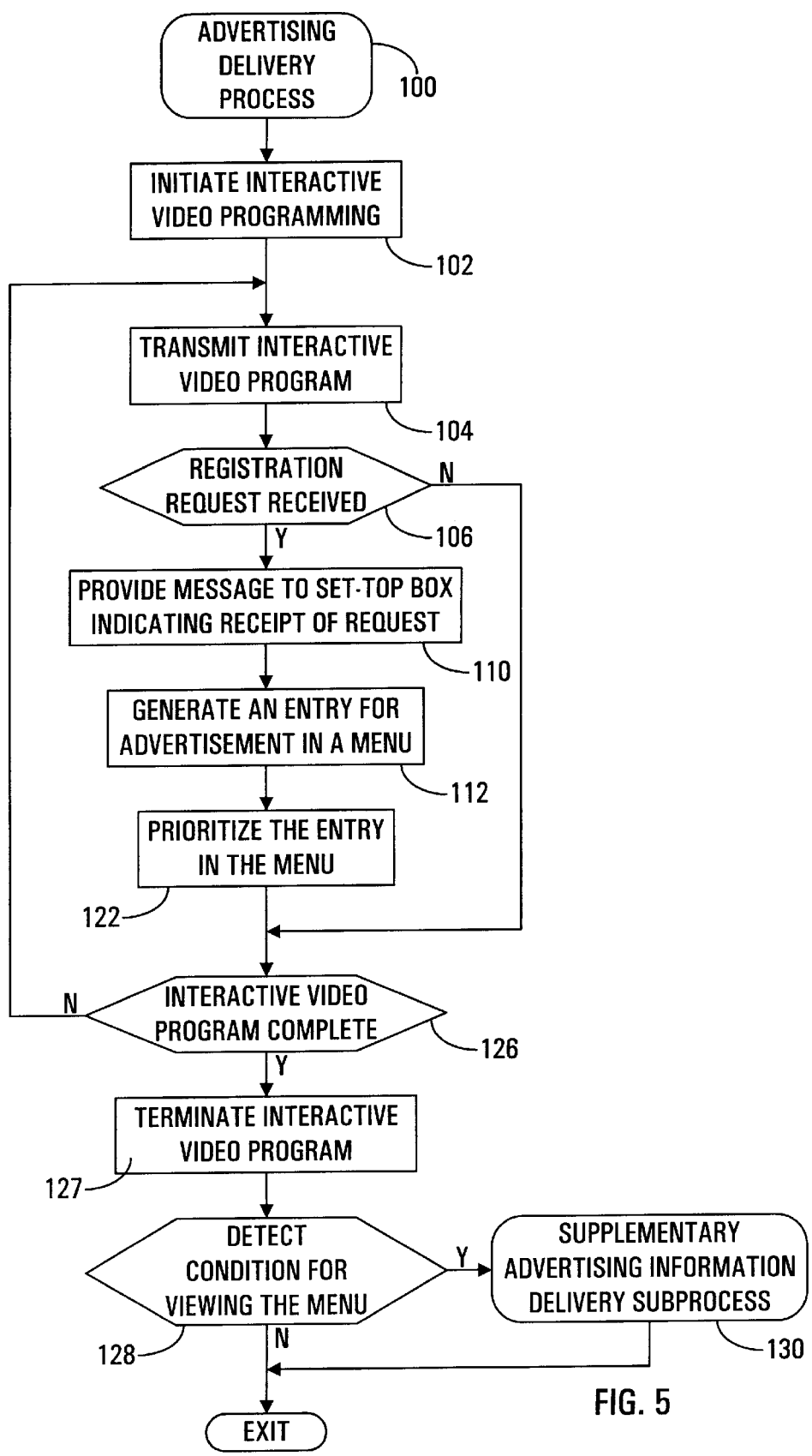
FIG. 5 shows a flow chart of an advertising delivery process performed at a head end facility of the interactive video distribution system.
Figure 7:
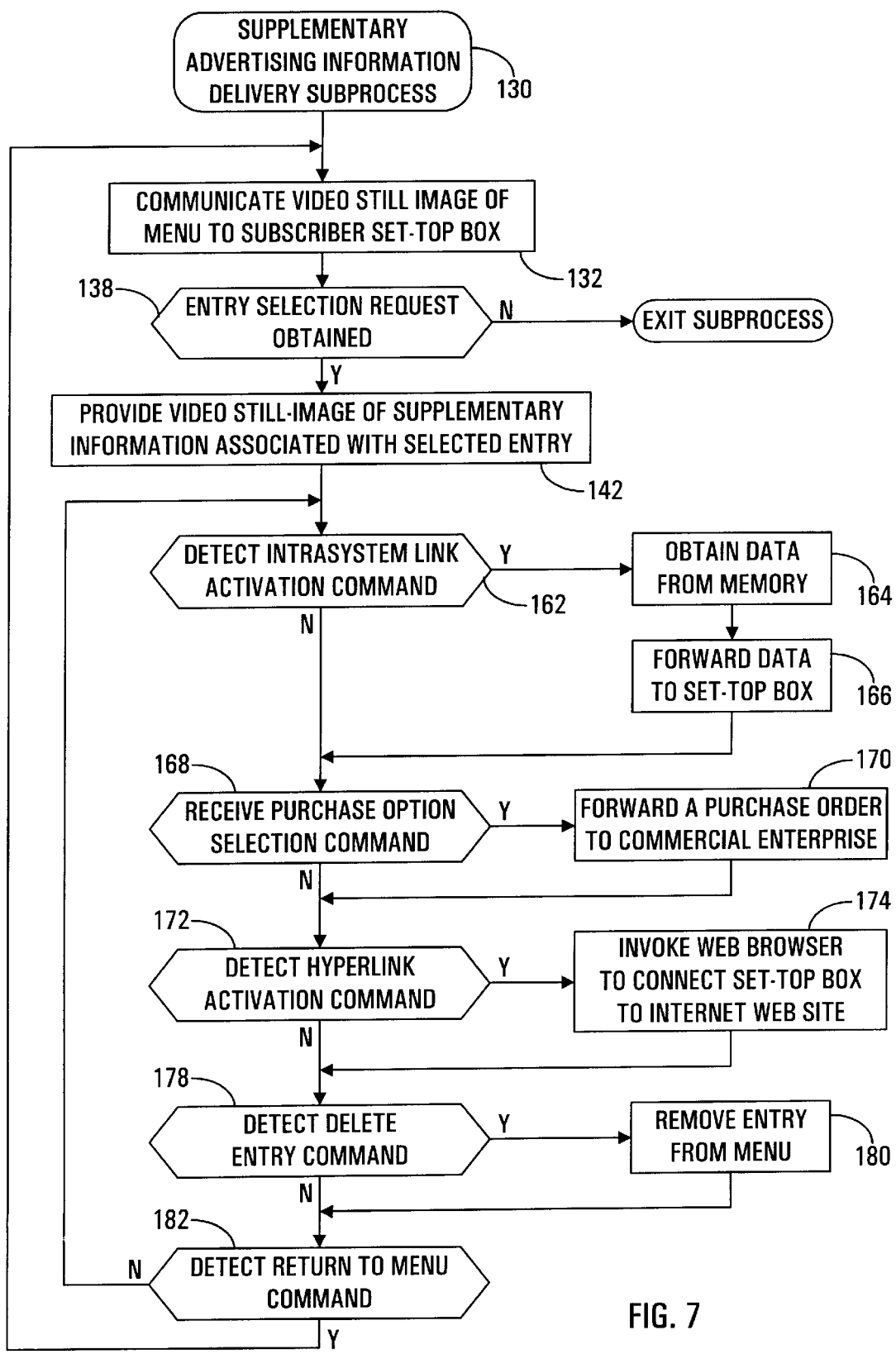
FIG. 7 shows a flow chart of a supplementary advertising information subprocess performed at the head end facility.

FIGS. 5 and 7 show processes performed by a computer program operated at computer 58 (FIG. 1). This computer program is defined by programming instructions which are stored in and executed from memory 78 of computer 58. Generally speaking, the computer program provides interactivity services for and in synchronism with full-motion program 36 (FIG. 2) and first and second advertisements 40 and 42, respectively. FIG. 5 shows a flow chart of an advertising delivery process 100 performed at head end facility 54 (FIG. 1) of interactive video distribution system 20 (FIG. 1). Process 100 is performed by head end facility 54 (FIG. 1) in connection with interactive video programming. Process 100 is described in connection with delivery of interactive full-motion programming and advertising to a single one of interactive subscriber units 22 for clarity of illustration. However, those skilled in the art will realize that a plurality of subscriber units 22 may be authorized to receive interactive video programming. Thus, head end facility 54 performs process 100 for each of interactive video subscriber units 22.

Process 100 begins with a task 102. Task 102 causes head end facility 54 to initiate interactive video programming. Initiation task 102 is performed by head end facility 54 when the interactive video program is scheduled to air. At interactive video program initiation, one or more of interactive video subscriber units 22 (FIG. 1) may be signed-on to receive interactive video programming. However, the interactive video program will air whether or not any of the interactive video subscribers are signed-on. A sign-on request by one of interactive video subscriber units 22 signifies that the subscriber wishes to participate in an upcoming interactive full-motion program. Subsequent to receiving the sign-on request, head end facility 54 may, for example, provide a list of ID's for programs that are scheduled to be broadcast and perform additional functions, known to those skilled in the art, for providing interactive video service. For clarity of illustration, the one of interactive video subscriber units 22 will be referred to herein as an interactive video subscriber unit 22' (FIG. 1).

Following task 102, full-motion program 36 is transmitted from video server 60 (FIG. 1) of head end facility 54 (FIG. 1) to interactive video subscriber unit 22'. Following the successful completion of task 102, head end facility 54 proceeds to transmit full-motion program 36 through video server 60 (FIG. 1) to interactive video subscriber unit 22'.

In connection with the transmission of full-motion video program 36, a task 104 causes first advertisement 40 (FIG. 2) to be transmitted to interactive video subscriber unit 22' at a first instant in time. First advertisement 40 may be a full-motion video segment, described previously, that is inserted into full-motion video program during advertisement break 43 (FIG. 2).

With reference to FIG. 4, first advertisement 40 is being displayed on television screen 98. A logo 108 identifies first advertisement 40 as an interactive advertisement. In other words, logo 108 informs the subscriber of interactive subscriber unit 22' that first advertisement 40 can be registered in the one of advertisement menus 92 (FIG. 1) which is associated with interactive subscriber unit 22'. The subscriber may wish to register first advertisement 40 if he or she desires to obtain supplementary advertising information, described below, about first advertisement 40. When the subscriber wishes to register first advertisement 40 into the associated advertisement menu 92, the subscriber creates a registration request, for example, by pressing a color coded key on subscriber interface 96 or by pressing another designated key or keys on subscriber interface 96.

Referring back to process 100 (FIG. 5), in response to task 104, an event task 106 causes head end facility 54 (FIG. 1) to determine if a registration request is received from set-top box 94 (FIG. 4) of interactive video subscriber unit 22' (FIG. 1). The registration request is forwarded through set-top box 94 (FIG. 4) over video distribution medium 56 (FIG. 1) and through video server 60 (FIG. 1) to an input 107 (FIG. 1) of processor 74 (FIG. 1). Input 107 is a return path from bidirectional video distribution medium 56 that may be routed through a home terminal server element of video server 60 (FIG. 1).

When event task 106 determines that a request to register first advertisement 40 is received, a task 110 is performed. Task 110 causes processor 74 (FIG. 1) of head end facility 54 to provide a message to set-top box 94 (FIG. 4) for display on television screen 98 that indicates receipt of the registration request. For example, a text message may be overlaid onto full-motion program 36 (FIG. 2) using out-of-band signaling to confirm receipt of the registration request and the addition of first advertisement 40 to the associated one of menus 92 (FIG. 1). This text message remains displayed on television screen 98 until H synchronization signal 52 (FIGS. 2–3) on synchronizing channel 44 (FIG. 2) of medium 30 causes the text message to be cleared from television screen 98.

In connection with task 110, a task 112 is performed by head end facility 54 (FIG. 1). Task 112 causes head end facility 54 to generate an entry for first advertisement 40 in the associated one of menus 92.

Figure 6:
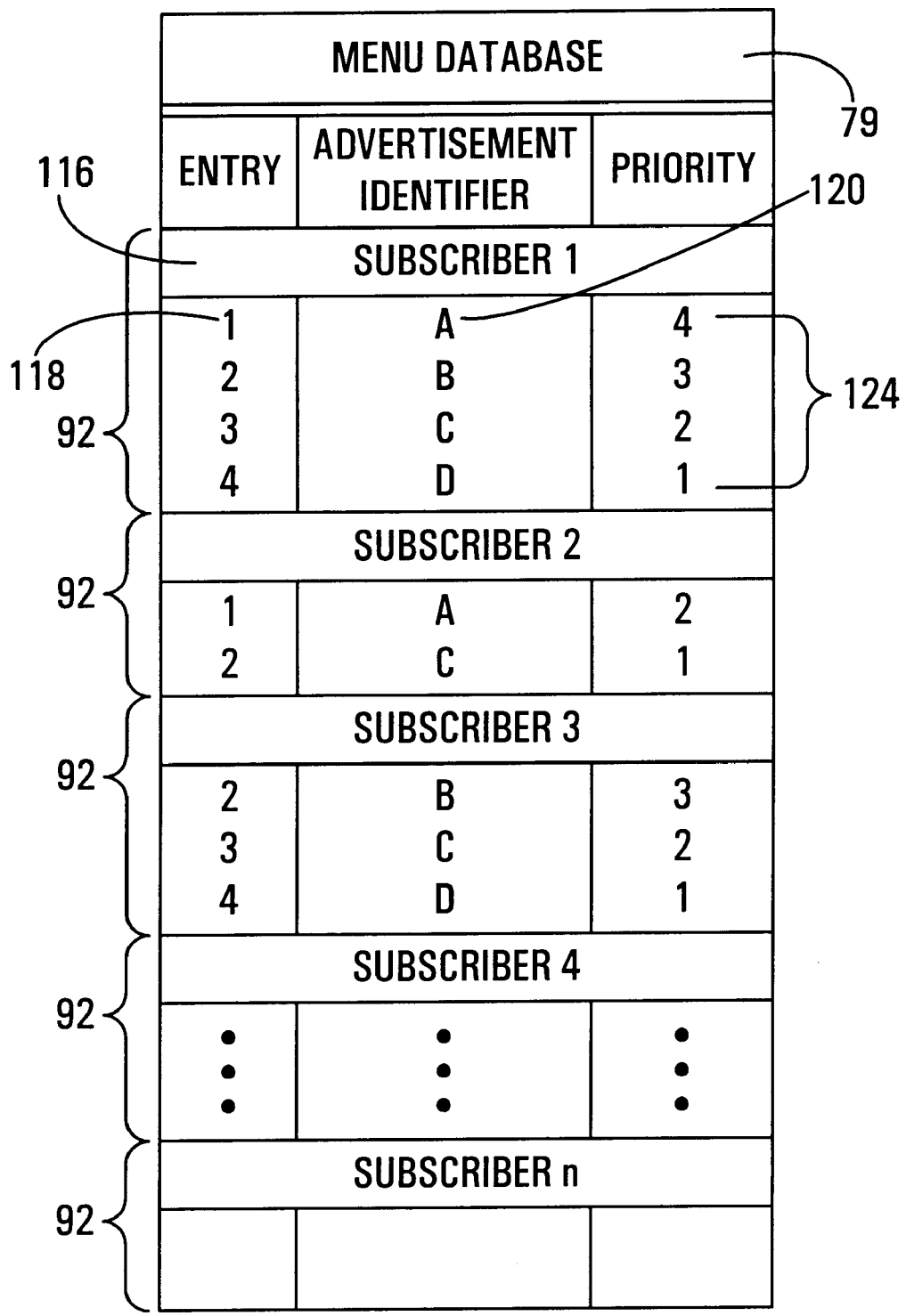
FIG. 6 shows a table of an exemplary menu database stored in a memory portion of the head end facility.

FIG. 6 shows an exemplary table 114 of menu database 79 stored in memory 78 (FIG. 1) of head end facility 54 (FIG. 1). Menu database 79 includes menus 92 associated with interactive video subscriber units 22 (FIG. 1). Each of menus 92 is maintained and updated by head end facility 54 (FIG. 1). In other words, entries to menu database 79 are added and removed in response to requests from any of interactive video subscriber units 22 (FIG. 1). Thus, each of menus 92 is customized for the specific subscriber in response to the subscriber's registration requests. In order to clarify the description of the preferred embodiment, exemplary table 114 shows a first menu 116 which identifies the one of menus 92 associated with interactive subscriber unit 22' (FIG. 1).

Referring back to process 100 (FIG. 5), task 112 causes head end facility 54 to generate a first entry 118 in first menu 116 for subscriber unit 22'. First entry 118 includes an advertisement identifier 120 corresponding to AD01B program-specific data 50, previously described, which is the advertisement identifier assigned to identify first advertisement 40. In addition, first entry 118 may include a textual description (not shown) of first advertisement 40.

In connection with task 112, a task 122 causes head end facility 54 to place first advertisement 40 in a prioritization order 124 (FIG. 6) in first menu 116 (FIG. 6). In accordance with a preferred embodiment of the present invention, advertisements are prioritized based on a last in first out buffering scheme in response to receipt of registration requests. In other words, the advertisement associated with the latest received registration request has the highest priority in prioritization order 124. Prioritization order 124 is utilized later by head end facility 54 (FIG. 1) when generating a video still image (described below) of first menu 116 for display at television screen 98 (FIG. 4) of interactive video subscriber unit 22' (FIG. 1).

Tasks 110, 112, and 122 are performed independently from the transmission of full-motion program 36. In other words, while computer 58 (FIG. 1) of head end facility 54 (FIG. 1) is generating an entry in menu database 79, full-motion program 36 continues to be transmitted from the video switch element of video server 60 (FIG. 1).

Following task 122 or when event task 106 determines that a registration request has not been received, process 100 proceeds to an event task 126. Event task 126 determines if full-motion program 36 (FIG. 2) is complete. The completion of full-motion program 36 is determined, for example, when a "B" synchronization signal 52 (FIG. 2), representing an end of interactive video program, is detected by computer 58 (FIG. 1) of head end facility 54. When full-motion program 36 is not complete, program control loops back to task 104 to continue to monitor for registration requests of subsequent advertisements for example, second advertisement 42 (FIG. 2) at a later point in time.

When event task 126 determines that full-motion program 36 is complete, process 100 proceeds to a task 127. Task 127 causes head end facility 54 (FIG. 1) to terminate interactive video programming. Termination of interactive video programming may be accomplished through an exchange of communication between set-top box 94 (FIG. 4) and head end facility 54 (FIG. 1). Following termination of interactive video programming, process 100 proceeds to an event task 128.

Event task 128 causes head end facility to detect a condition to view first menu 116 (FIG. 6). In the preferred embodiment, upon detection of completion of full-motion program 36, computer 58 (FIG. 1) automatically recognizes a condition necessary for the computer program to communicate first menu 116 to interactive video subscriber unit 22'. Alternatively, a command may be detected at head end facility 54 (FIG. 1) from set-top box 94 (FIG. 4) in which a subscriber has entered the command through subscriber interface 96 (FIG. 4) from, for example, a main menu (not shown).

When event task 128 detects a condition or a command to view first menu 116, a supplementary advertising information delivery subprocess 130 is performed.

FIG. 7 shows a flow chart of supplementary advertising information subprocess 130 performed at head end facility 54 (FIG. 1). Subprocess 130 is performed to acquire additional, or supplementary, information related to an advertisement. Subprocess 130 may be performed automatically following the completion of an interactive video program or on command by a subscriber at the subscriber's convenience.

Subprocess 130 begins with a task 132. Task 132 causes processor 74 (FIG. 1) to provide a video still image to the digital media server element of video server 60 (FIG. 1). The video still image is then communicated from video server 60 through video distribution medium 56 to set-top box 94 (FIG. 4) for display on television screen 98 (FIG. 4) of interactive video subscriber unit 22'.

Figure 8:
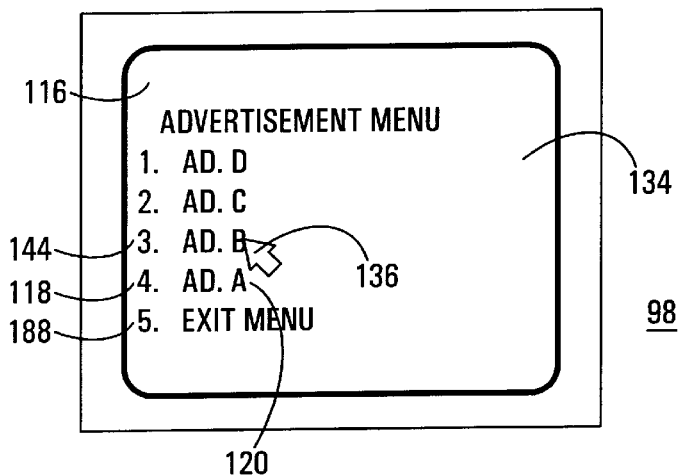
FIG. 8 shows an illustration of a video still image of an advertisement menu on a subscriber television screen.

FIG. 8 shows an illustration of subscriber television screen 98 displaying a video still image 134 of first menu 116. Although prioritization order 124 (FIG. 6) is not expressly shown in video still image 134, processor 74 configures first menu 116 in video still image 134 using prioritization order 124 (FIG. 6) established when generating entries in menu database 79 (FIG. 6). For example, since first advertisement 40 was the first advertisement for which a registration request was received, advertisement identifier "A" 120 is the last advertisement identifier listed in video still image 134.

First menu 116 shows advertisement identifiers for a number of advertisements that were registered in menu database 79 (FIG. 6) for the subscriber of subscriber unit 22'. First menu 116, as presented as video still image 134, is an interactive menu. In other words, a pointer 136 may be moved by the subscriber using subscriber interface 96 (FIG. 4), for example by moving a mouse. Alternatively, up/down keys on subscriber interface 96 may be pressed to successively highlight, or point to, one of the entries in first menu 116, or the subscriber may press a number key on subscriber interface 96 associated with an advertisement.

With reference back to subprocess 130 (FIG. 7), following communication task 132, an event task 138 is performed. Event task 138 causes processor 74 to monitor for an entry selection request from interactive video subscriber unit 22'. When the subscriber desires to learn more about an advertisement listed in video still image 134, the subscriber selects one of the entries by moving pointer 136, or some other indicator, to that entry and selecting it by pressing a key on subscriber interface 96. Alternatively, the subscriber may press a number key on subscriber interface 96 associated with the entry.

The selection request is forwarded through set-top box 94 (FIG. 4) over video distribution medium 56 (FIG. 1) and through video server 60 (FIG. 1) to input 107 (FIG. 1) of processor 74 (FIG. 1). When a entry selection request is obtained, subprocess 130 proceeds to a task 142.

Task 142 causes processor 74 to provide a second video still image through video server 60 and over video distribution medium 56 to set-top box 94 (FIG. 4) for subsequent display on television screen 98. In the exemplary embodiment pointer 136 (FIG. 8) is pointed at, and a subscriber selects, a second entry 144 associated with second advertisement 42 (FIG. 2). Alternatively, the subscriber may press a "3" key on subscriber interface 96 (FIG. 4).

Figure 9:
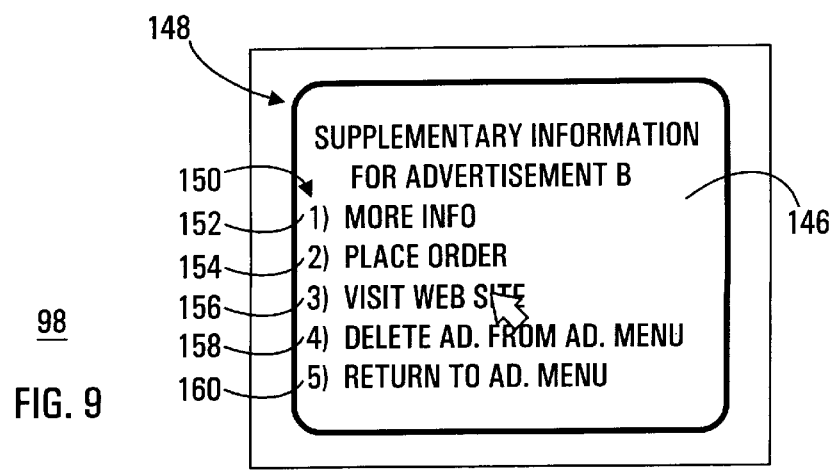
FIG. 9 shows an illustration of a video still image of supplementary information for one of the advertisements from the advertisement menu shown in FIG. 8.

FIG. 9 shows an exemplary illustration of subscriber television screen 98 displaying a second video still image 146 of supplementary advertising information 148 associated with second advertisement 42. In the preferred embodiment, supplementary advertising information 148 is in the form of a second interactive menu 150. The subscriber may select any of the entries in second interactive menu 150 in the same manner in which entries from first menu 116 were selected.

As illustrated in FIG. 9, interactive menu 150 includes an intrasystem link (MORE INFO) entry 152, a purchase option (PLACE ORDER) entry 154, a hyperlink (VISIT WEB SITE) entry 156, a delete advertisement from menu entry 158, and a return to advertisement menu entry 160. However, supplementary advertising information 148 need not be presented exactly as illustrated. Rather supplementary advertising information 148 may have different combinations of the above named entries. Alternatively, supplementary advertising information 148 may be a text-based or full-motion video segment providing the subscriber with additional information regarding the advertised product, service, or public notice.

With reference back to subprocess 130 (FIG. 7), following the provision of second interactive menu 150 (FIG. 9) in second video still image 146 (FIG. 9), an event task 162 determines if intrasystem link entry 152 is detected. In other words, event task 162 causes processor 74 (FIG. 1) to determine if a command to activate an intrasystem link is detected at processor input 107. An intrasystem link is an address embedded in the phrase "MORE INFO" of second interactive menu 150 that is activated when entry 152 is selected. The intrasystem address is recognized by processor 74 as an address to a location in memory 78 (FIG. 1).

When an intrasystem link activation command is detected by processor 74, program control proceeds to a task 164. Task 164 causes processor 74 to obtain data related to the advertisement from the addressed location in memory 78. The data may be textual information such as the address and telephone numbers for commercial enterprise 86 (FIG. 1) and/or graphical information such as drawings and photographs.

In response to task 164, a task 166 causes processor 74 to forward the data through the digital media server element of video server 60 (FIG. 1), over video distribution medium 56 (FIG. 1), and to set-top box 94 (FIG. 4) for subsequent display on television screen 98 (FIG. 4).

Following receipt of the data through the intrasystem link to memory 78, the subscriber may return to second interactive menu 150 through conventional interactive techniques for returning to a previous display. Thus, following task 166 or when a negative response to intrasystem link event task 162 is determined, subprocess 130 proceeds to an event task 168.

Event task 168 determines if purchase option entry 154 (FIG. 9) is selected. In other words, event task 168 causes processor 74 (FIG. 1) to determine if a purchase option command is detected at processor input 107.

When entry 154 is received, program control proceeds to a task 170. Task 170 causes processor 74 to forward a purchase order through modem bank 82 (FIG. 1), and PSTN 84 (FIG. 1), to commercial enterprise 86 (FIG. 1). The purchase order may be in the form of an electronic mail (e-mail) message to commercial enterprise 86 containing information regarding the subscriber, such as mailing address, telephone number, charge card number, and so forth.

Following forwarding of a purchase order, the subscriber may return to second interactive menu 150 through conventional interactive techniques for returning to a previous display. Thus, following task 170 or when a negative response to purchase option selection event task 168 is determined, subprocess 130 proceeds to an event task 172.

Event task 172 determines if hyperlink entry 156 (FIG. 9) is detected. In other words, event task 172 causes processor 74 (FIG. 1) to determine if a command to activate a hyperlink is detected at processor input 107. A hyperlink is a network address for Internet 88 (FIG. 1) that is embedded in the phrase "VISIT WEB SITE" of second interactive menu 150. The hyperlink is activated when entry 156 is selected. When processor 74 detects hyperlink entry 156 in event task 172, program control proceeds to a task 174.

Task 174 causes processor 74 to invoke web browser 90 (FIG. 1) from memory 78 (FIG. 1) to access a first web site 176 (FIG. 1) related to commercial enterprise 86 (FIG. 1). First web site 176 contains supplementary advertising information such as, company statistics, product and price lists, hyperlinks to more web pages related to commercial enterprise 86, and so forth.

Internet 88 is not a single network, it has no owner or controller, but is an unruly network of networks, a confederation of many different nets, public and private, big and small, that have agreed to connect to one another. Internet 88 relies on no single transmission medium. Bi-directional communication can occur via satellite links, fiber-optic trunk line, phone lines, cable television wires, and local radio links. Web browser 90 is configured to provide access to Internet 88 using the hyperlink to navigate toward first web site 176.

When web browser 90 finds first web site 176, processor 74 (FIG. 1) connects set-top box 94 (FIG. 4) to first web site 176 by transmitting a digital representation of first web site 176 to set-top box 94 through the digital media server element of video server 60 (FIG. 1) for subsequent transmission over video distribution medium 56 to set-top box 94. First web site 176 is then conveniently displayed on television screen 98 (FIG. 4) to provide supplemental advertising information.

Following display of first web site 176 on television screen 98, the subscriber may return to second interactive menu 150 through conventional interactive techniques for returning to a previous display. Thus, following task 174 or when a negative response to hyperlink activation event task 172 is determined, subprocess 130 proceeds to an event task 178.

Event task 178 determines if delete advertisement entry 158 (FIG. 9) is detected. In other words, event task 178 causes processor 74 (FIG. 1) to determine if a command to delete the advertisement from the advertisement menu is detected at processor input 107 (FIG. 1).

When processor 74 detects a command to delete the advertisement from the advertisement menu, program control proceeds to a task 180. Task 180 causes processor 74 to remove the entry from the advertisement menu. In the exemplary illustration, the detection of delete advertisement entry 158 serves to remove second entry 144 (FIG. 8) for advertisement B from first menu 116. Once second entry 144 is removed from first menu 116, a subscriber will be unable to receive supplementary advertising information 148 (FIG. 9) related to second advertisement 42 (FIG. 2). Thus, task 180 allows a subscriber to further customize first menu 116 by removing an advertisement entry that is no longer wanted.

Following the deletion of second entry 144 (FIG. 8) from first menu 116 (FIG. 8), the subscriber may return to second interactive menu 150 through conventional interactive techniques for returning to a previous display. Thus, following task 180 or when a negative response to event task 178 is determined, subprocess 130 proceeds to an event task 182.

Event task 182 determines if return to advertisement menu entry 160 (FIG. 9) is detected. In other words, event task 182 causes processor 74 (FIG. 1) to determine if a command to return to the advertisement menu is detected at processor input 107 (FIG. 1).

When processor 74 does not detect a command to return to the advertisement menu, second video still image 146 (FIG. 9) remains displayed on television screen 98 (FIG. 4), and program control loops back to event task 162 to continue monitoring for commands for any of entries 152, 154, 156, 158, and 160. Thus, a subscriber can review any of the information and links provided in supplementary advertising information 146 (FIG. 9) in any order, and as many times as he or she wishes.

When processor 74 detects a command to return to the advertisement menu, program control loops back to task 132 and video still image 134 (FIG. 8) of first menu 116 (FIG. 8) is communicated to set-top box 94 (FIG. 4) for display on television screen 98. Video still image 134 (FIG. 8) remains displayed on television screen 98 (FIG. 4), until event task 138 determines if a selection request for another entry from first menu 116 is detected.

Thus, a subscriber can select another entry, such as first entry 118 (FIG. 8) for first advertisement 40 so that processor 74 obtains a selection request for first entry 118. Subprocess 130 is then repeated for first entry 118 to obtain data related to first advertisement 40 from memory 78 (FIG. 1), forward a purchase order, or connect interactive video subscriber unit 22' to a second web site 186 (FIG. 1) for a second one of commercial enterprises 86 (FIG. 1). Thus, a subscriber can review any of the information and links provided for any of the advertisement entries in first menu 116 in any order and as many times as he or she wishes.

Event task 138 causes processor 74 to continue to monitor for an advertisement entry selection request. When an advertisement entry selection request is not obtained, for example, when an exit menu command 188 is received or following a predetermined interval of time, subprocess 130 exits.

With reference back to advertising delivery process 100 (FIG. 5), following an exit from subprocess 130 or when processor 74 does not detect a condition for viewing the advertisement menu in event task 128, advertising delivery process 100 exits. However, the advertisement menu is retained in menu database 79 (FIG. 6) of memory 78 (FIG. 1) for later retrieval by the subscriber.

In summary, the present invention provides a method and system for effectively delivering advertising to viewers. Effective delivery of advertising is accomplished by providing interactive advertisements in connection with interactive video programming. The interactive programming techniques allow a subscriber to selectively obtain supplementary advertising information related to a viewed advertisement in the form of links to data stored in memory at the head end facility, hyperlinks to the Internet, and purchase option capability. Moreover, the supplementary advertising information is received through a subscriber's television, eliminating the need for remembering or writing down telephone numbers and addresses in order to call, send a letter, or access a separate computer system to obtain supplementary advertising information. Furthermore, since the advertisement menus are maintained in the head end facility, the subscriber is able to save and retrieve the supplemental advertising information for an extended period of time.

Although the preferred embodiments of the invention have been illustrated and described in detail, it will be readily apparent to those skilled in the art that various modifications may be made therein without departing from the spirit of the invention or from the scope of the appended claims. For example, those skilled in the art will appreciate that conventional computer programming techniques may be applied to produce equivalent steps to those described herein through a vastly different configuration of tasks. Furthermore, while the present invention is described in terms of analog interactive television, such as that commercially available under the trade name mainStreets$^{sm}$, nothing prevents the principles described herein from being applied to an interactive video distribution system that is Motion Pictures Experts Group (MPEG) compliant.

What is claimed is:

1. A method of delivering advertising through a head end facility of an interactive video distribution system, said method comprising the steps of:

transmitting an advertisement to an interactive video subscriber unit in connection with an interactive video program;

receiving, at said head end facility over a return path, a request to register said advertisement in a menu;

generating an entry for said advertisement in said menu;

communicating to said subscriber unit, said menu in a video still image;

obtaining, at said head end facility over said return path, a selection request for said entry; and providing to said subscriber unit, in response to said selection request, supplementary advertising information associated with said advertisement.

2. A method as claimed in claim 1 further comprising the steps of:

assigning an advertisement identifier to said advertisement;

inserting said advertisement into said interactive video program at a predetermined time period during said interactive video program, said predetermined time period being described by a start signal and a stop signal, and said assigning and said inserting steps being performed prior to said transmitting step; and utilizing said advertisement identifier to identify said advertisement in response to said received request.

3. A method as claimed in claim 1 further comprising the step of inserting a logo into said advertisement prior to said transmitting step, wherein said logo informs a subscriber of said subscriber unit that said advertisement can be registered in said menu.

4. A method as claimed in claim 1 wherein said receiving step comprises the step of providing to said subscriber unit a message indicating receipt of said request.

5. A method as claimed in claim 1 wherein said advertisement is a first advertisement, said transmitting, receiving, and generating steps are performed at a first instant, and said method further comprises the steps of:

transmitting a second advertisement to said interactive video subscriber unit in connection with said interactive video program at a second instant;

receiving, at said head end facility over said return path, a second request to register said second advertisement in said menu; and generating a second entry for said second advertisement in said menu prior to said communicating step.

6. A method as claimed in claim 5 wherein said second instant occurs after said first instant, and said method further comprises the step of configuring said menu to give priority to said second entry over said first entry.

7. A method as claimed in claim 5 wherein following said communicating step, said method further comprises the steps of:

obtaining, at said head end facility over said return path, a second selection request for said second entry; and providing to said subscriber unit, in response to said second selection request, supplementary advertising information associated with said second advertisement.

8. A method as claimed in claim 1 wherein said communicating step occurs automatically following completion of said interactive video program.

9. A method as claimed in claim 1 further comprising the step of detecting, at said head end facility over said return path, a command to perform said communicating step.

10. A method as claimed in claim 1 wherein said supplementary advertising information includes an intrasystem link for accessing a memory portion of said interactive video distribution system, and said method further comprises the steps of:

detecting, at said head end facility over said return path, a command for activating said intrasystem link;

obtaining data related to said advertisement from said memory portion; and forwarding said data to said interactive video subscriber unit.

11. A method as claimed in claim 1 wherein said advertisement is associated with a commercial enterprise, said supplementary advertising information includes a purchase option, and said method further comprises the steps of:

a) receiving, at said head end facility over said return path, a command for selecting said purchase option; and b) forwarding a purchase order in response to said step a) to said commercial enterprise.

12. A method as claimed in claim 1 wherein said head end facility includes a web browser configured to provide access to the Internet, said supplementary advertising information includes a hyperlink for navigating toward an Internet web site of a provider associated with said advertisement, and said method further comprises the steps of:

detecting, at said head end facility over said return path, a command for activating said hyperlink; and invoking said web browser to connect said interactive video subscriber unit to said Internet web site in response to said activated hyperlink.

13. A method as claimed in claim 1 further comprising the step of removing said entry from said menu following said providing step.

14. An interactive video distribution system comprising:

a plurality of interactive video subscriber units;

a head end facility configured to transmit an advertisement in connection with an interactive video program and receive a request from one of said subscriber units to register said advertisement in a menu; and a video distribution medium coupled between said head end facility and said plurality of interactive video subscriber units, said video distribution medium being configured to convey said advertisement to each of said interactive video subscriber units on a forward path and convey said request from said one of said subscriber units to said head end facility on a return path.

15. A system as claimed in claim 14 wherein said advertisement is in a full-motion video format.

16. A system as claimed in claim 14 wherein:

said system additionally comprises an editing facility configured to generate said advertisement and said interactive program for transmission from said head end facility, said editing facility being further configured to assign an advertisement identifier to said advertisement and insert said advertisement into said interactive video program at a predetermined time period during said interactive video program; and said head end facility includes a processor configured to utilize said advertisement identifier to identify said advertisement in response to said received request.

17. A system as claimed in claim 16 wherein said editing facility is further configured to insert a logo into said advertisement, said logo informing a subscriber of said one of said subscriber units that said advertisement can be registered in said menu.

18. A system as claimed in claim 14 wherein said video distribution system is configured to provide to said one of said subscriber units a message indicating a receipt of said request.

19. A system as claimed in claim 14 wherein said head end facility includes a processor having a computer program configured to manage a plurality of menus, one each of said menus being associated with one each of said plurality of interactive video subscriber units.

20. A system as claimed in claim 14 wherein:
   said head end facility includes a processor having a computer program configured to produce a video still image of said menu, said advertisement having an entry in said menu; and
   said video distribution system is configured to communicate said video still image for display on a video screen of said one of said interactive video subscriber units and convey a selection request for said entry on said return path.

21. A system as claimed in claim 20 wherein:
   said computer program is further configured to provide supplementary advertising information associated with said advertisement; and
   said video distribution medium is configured to communicate said supplementary advertising information for display on said video screen and convey a command for a portion of said supplementary advertising information on said return path.

22. A system as claimed in claim 21 wherein said supplementary advertising information is provided in a second video still image associated with said entry.

23. A system as claimed in claim 21 wherein said supplementary advertising information includes:
   an intrasystem link for accessing a memory portion of said head end facility;
   a purchase option for communicating a purchase order to a commercial enterprise associated with said advertisement; and
   a hyperlink for navigating toward an Internet web site of said commercial enterprise;
   wherein said command identifies one of said intrasystem link, said purchase option, and said hyperlink.

24. A system as claimed in claim 21 wherein:
   said portion of said supplementary advertising information includes a hyperlink for navigating toward an Internet web site of a provider associated with said advertisement; and
   said head end facility includes a web browser for accessing the Internet to connect said one of said interactive video subscriber units to said Internet web site when said hyperlink is activated.

25. A method of delivering advertising through a head end facility of an interactive video distribution system, said method comprising the steps of:
   transmitting a plurality of full-motion video (FMV) advertisements to an interactive video subscriber unit in connection with an interactive video program;
   receiving, at said head end facility over a return path, requests to register a first and a second FMV advertisement from said plurality of FMV advertisements in a menu, one each of said requests being associated with one each of said first and second FMV advertisements;
   providing messages indicating receipt of each of said requests;
   generating a first entry associated with said first FMV advertisement in said menu;
   generating a second entry associated with said second FMV advertisement in said menu;
   communicating said menu in a first video still image to said subscriber unit, said communicating step being performed automatically following the completion of said interactive video program;
   obtaining, at said head end facility over said return path, a selection request for one of said first and second entries;
   providing to said subscriber unit, in response to said selection request, a hyperlink in a second video still image for navigating toward an Internet web site of a provider associated with said one of said first and second FMV advertisements;
   detecting, at said head end facility over said return path, a command for activating said hyperlink; and
   invoking a web browser of said head end facility to connect said interactive video subscriber unit to said Internet web site in response to said activated hyperlink.

26. A method as claimed in claim 25 wherein said obtaining, providing, detecting, and invoking steps occurs at a first instant, and said method further comprises the steps of:
   obtaining, at a second instant, a second selection request for a second one of said first and second entries;
   providing to said subscriber unit, in response to said second selection request, a second hyperlink in a third video still image for navigating toward a second Internet web site of a second provider associated with said second one of said first and second FMV advertisements;
   detecting, at said head end facility over said return path, a command for activating said second hyperlink; and
   invoking said web browser to connect said interactive video subscriber unit to said second Internet web site in response to said activated second hyperlink.

\* \* \* \* \*